United States Patent [19]

Halasa et al.

[11] 4,052,370

[45] Oct. 4, 1977

[54] ALKALI METAL ALIPHATIC AND AROMATIC HYDROCARBON ACETALS AND KETALS AND THEIR USE AS POLYMERIZATION INITIATORS

[75] Inventors: Adel Farhan Halasa, Bath; Donald Norman Schulz, Hartville, both of Ohio

[73] Assignee: The Firestone Tire & Rubber Company, Akron, Ohio

[21] Appl. No.: 498,838

[22] Filed: Aug. 19, 1974

Related U.S. Application Data

[62] Division of Ser. No. 314,876, Dec. 13, 1972, Pat. No. 3,862,100.

[51] Int. Cl.$^2$ ............................................. C08G 18/62
[52] U.S. Cl. .............................. 260/77.5 CR; 526/20; 526/21; 526/22
[58] Field of Search .................. 260/77.5 CR, 94.2 R, 260/94.2 M, 94.7 R, 94.7 S, 94.7 A, 82.1; 526/20, 21, 22

[56] References Cited

U.S. PATENT DOCUMENTS

| | | |
|---|---|---|
| 3,041,312 | 6/1962 | Boyd .............................. 260/94.2 M |
| 3,254,062 | 5/1966 | Forman .......................... 260/94.2 M |
| 3,410,836 | 11/1968 | Hsieh et al. .................... 260/94.2 M |
| 3,580,895 | 5/1971 | Onishi et al. ................... 260/94.2 M |
| 3,674,743 | 7/1972 | Verdol et al. ................. 260/77.5 CR |
| 3,838,108 | 9/1974 | Hergenrother et al. ..... 260/77.5 CR |

*Primary Examiner*—M. J. Welsh

[57] ABSTRACT

Alkali metal aliphatic and aromatic hydrocarbon acetals and ketals are initiators for the polymerization of conjugated dienes and copolymerization of conjugated diene and vinyl monomers. Mono-acetal and mono-ketal polymers are produced by termination of the foregoing polymers and copolymers with methanol, isopropanol, etc.; diacetal and diketal polymers are produced by terminating said polymers and copolymers with a joining agent, e.g. $Cl_2Si(CH_3)_2$; and polyacetal and polyketal polymers and copolymers are produced by terminating said polymers and copolymers with a polyfunctional joining agent, e.g. $Cl_3SiCH_3$. Other mono-acetal and mono-ketal polymers are prepared by terminating said polymers and copolymers with ethylene oxide or carbon dioxide. The terminally reactive acetal polymers can be converted to other useful polymeric products. For example, terminal primary hydroxy polymers are produced by hydrolyzing the foregoing acetal and ketal polymers and copolymers with dichloroacetic acid catalyst in toluene:water mixtures.

Terminal monohydroxy polymers are produced by hydrolyzing polymers and copolymers terminated at one end with an acetal or ketal group. Terminal dihydroxy polymers are produced by (a) hydrolyzing polymers and copolymers terminated at one end by an acetal or ketal group and with a hydroxy group at the other terminal or (b) by hydrolyzing diacetal or diketal polymers. Terminal trihydroxy (polyhydroxy) polymers are formed by hydrolyzing triacetal or triketal (polyacetal or polyketal) polymers. Hydrolyzed acetal or ketal polymers (especially di- and trifunctional) are converted by suitable chain-extension processes (e.g. by polymerization or copolymerization) to give sulfur-curable elastomers.

11 Claims, No Drawings

ALKALI METAL ALIPHATIC AND AROMATIC HYDROCARBON ACETALS AND KETALS AND THEIR USE AS POLYMERIZATION INITIATORS

This is a division, of application Ser. No. 314,876 filed Dec. 13, 1972 and now U.S. Pat. No. 3,862,100.

This invention relates to the use of alkali metal aliphatic and aromatic hydrocarbon acetals and ketals in various processes and includes new products which are produced.

The invention relates to various terminally functional polymers and processes for preparing the same. A number of different terminally reactive polymers are discussed, e.g. acetal polybutadienyl lithium polymers, monoacetal polymers, diacetal polymers, triacetal polymers, monoacetal mono-X polymers (in which X stands for any one of various chemical groups), dihydroxy polymers, trihydroxy polymers, etc. Lithium-terminated polymers are defined herein as "live" polymers.

Polymers with terminal functional groups are to be distinguished from polymers with randomly functional groups. The utilization of terminal end groups on a polymer backbone enables substantially more effective cures than are possible with randomly functional polymers. Compounds which are chain-extended through terminal end groups contain no dangling chain ends to weaken the vulcanizate network. Also a greater molecular weight between crosslinks can be achieved with a terminally functional polymer than with a randomly functional polymer. Thus, by simple chain extension, liquid polymers can be increased in viscosity and even converted to solids while soft gums can be chain extended to more rigid materials.

Chain extension, as the term is used herein, broadly means increasing the molecular weight of a monomer or polymer having terminally functional groups by curing or coupling or crosslinking to produce a polymer of greater molecular weight.

The use of acetal and ketal lithium initiators assures the production of terminal functional groups in the polymers because the functionality (albeit protected functionality) is built right into the initiator itself and the initiators are incorporated as chain ends.

When the polymer backbone is a homopolymer or a copolymer of a conjugated diene containing 4 to 6 carbon atoms or a copolymer of such a conjugated diene and a vinyl monomer, there is also a capacity for further sulfur of peroxide cures of the olefinic bonds. One of the most useful ranges for terminally functional polybutadiene polymers is the molecular-weight range of 600–10,000 because such polymers are liquid and pourable with an intrinsic viscosity of 0.04–1.0. Such polymers, whether pourable or of higher molecular weight, may be used as disclosed herein for the production of hydroxy polymers which, in turn, may be used as end products for various purposes, and are disclosed herein as intermediates for chain-extended polymers which may be used as adhesives, binders (especially for solid rocket fuels), potting compounds, caulking componds, sealants, and also many types of molded articles. Each of the examples which follow produces such a product, the suitability for any particular use depending upon its molecular weight.

The processes and products to which the invention relates may be grouped as follows:

1. Initiators for the polymerization and copolymerization of conjugated dienes and the copolymerization of conjugated dienes with aliphatic and aromatic vinyl monomers. The processes and the "live" polymers are new.
2. The production of mono-acetal and -ketal polymers and copolymers by terminating said "live" polymers and copolymers with alcohols, e.g. methanol, isopropanol, etc. The polymers and copolymers are new.
3. The production of di- and poly-acetal and di- and poly-ketal polymers and copolymers by terminating said "live" polymers and copolymers with a difunctional or polyfunctional joining agent; for example, $CH_2Cl_2$, $CH_3Cl$, $CCl_4$, $Cl_2Si(CH_3)_2$, $C_8H_8Br_2$, $1,1'$-dichlorodimethyl ether, $(ClCH_2)_2.C_6H_4$, diisocyanates, $Cl_3Si.CH_3$, triisocyanates, $Cl_3CH$, etc. The polymers and copolymers are new.
4. The production of monoacetal and monoketal-mono(X) polymers (X=—ROH,—COOH,—CSSH,—SH, etc.) by terminating said "live" polymers and copolymers with anionically reactive agents, e.g. epoxides, aldehydes, ketones, carbon dioxide, carbon disulfide, sulfur, alkyl disulfides, etc., followed by treatment with a protic solvent. The polymers and copolymers and the processes are new.
5. The conversion of acetal and ketal polymers and copolymers into hydroxy polymers and copolymers.

Terminal monohydroxy polymers and copolymers are produced by hydrolyzing polymers and copolymers terminated at one end with an acetal or ketal group.

Terminal dihydroxy polymers and copolymers are produced in either of the following ways:
a. reacting one of said "live" acetal or ketal polymers or copolymers with an alkylene oxide such as ethylene oxide or propylene oxide, etc., and hydrolyzing the product;
b. hydrolyzing

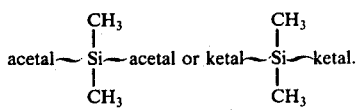

The products are new.

Terminal tri(or higher poly) hydroxy polymers are formed by hydrolyzing tri(or higher poly) acetal or tri(or higher poly) ketal polymers and copolymers. These processes are new.

6. Chain-extending hydrolyzed terminal acetal or ketal polymers to give polyurethanes, polyesters, etc.

PRIOR ART

Ethyl lithium-3-propyl acetaldehyde acetal

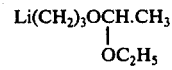

and its production are disclosed in HYDROXYPROPYLATION by Eaton, Cooper, Johnson and Mueller in J.Org.Chem. 37, 1947–1950 (1972).

Other lithium (and other alkali metal) aliphatic and aromatic hydrocarbon acetals and the corresponding ketals can readily be prepared following a procedure analogous to that disclosed by Eaton et al. Such compounds are represented by the following formulae:

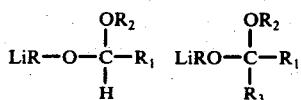

Acetal    Ketal in which R is a branched- or straight-chain or cycloalkylene group of 1 to 20 carbon atoms or phenylene or alkyl phenylene in which each alkyl group contains 1 to 3 carbon atoms, and $R_1$, $R_2$ and $R_3$ are straight-chain or branched-chain or cyclo-alkyl groups of 1 to 3 or 5 or 10 or more carbon atoms or phenyl, or alkyl phenyl in which each alkyl group contains 1 to 3 carbon atoms; it being understood that $R_1$ and $R_2$ may be alkyl groups which are part of a ring, e.g. a pyranyl group. The lithium acetals and ketals, such as those disclosed herein and represented by the foregoing formulae are hydroxyl carriers and are to be distinguished from compounds having either of the following formulae:

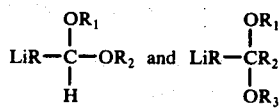

Acetal    Ketal which are carbonyl carriers. In carrying out the invention, any hydroxy carrier hydrocarbon aliphatic or aromatic acetal or ketal may be used. Representative compounds in which "Et" stands for ethyl and $n = 1$ to 20 are:

Acetals

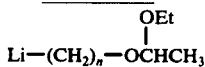

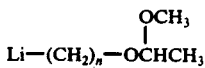

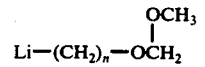

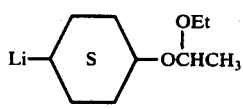

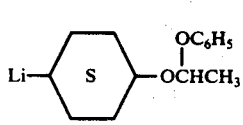

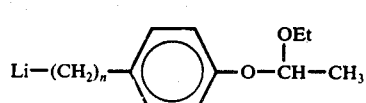

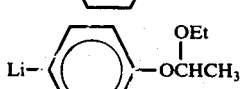

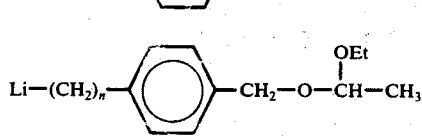

-continued

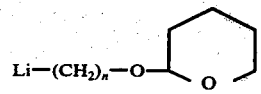

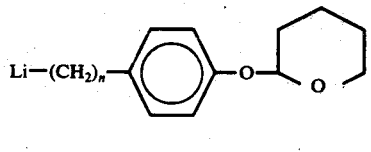

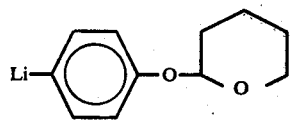

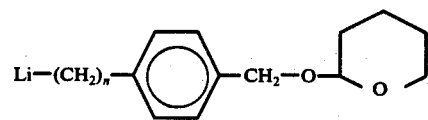

Na—(CH$_2$)$_n$—acetal

K—(CH$_2$)$_n$—acetal

Ketals

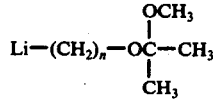

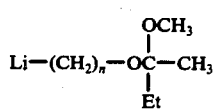

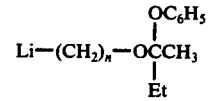

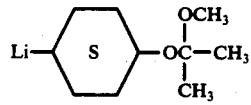

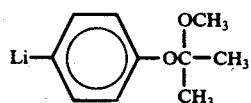

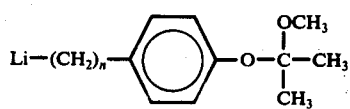

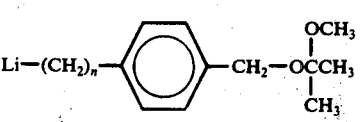

Na—(CH$_2$)$_n$—ketal

K—(CH$_2$)$_n$—ketal

Goldberg U.S. Pat. Nos. 3,055,952, Hsieh 3,175,997, and S. Reed (J.Poly.Sci.A-1, 1187, 1972) each contain an extensive discussion of preparing dihydroxy-terminated polymers by treating dilithium polymers with ethylene oxide. Undesirable gelation problems have been encountered with the procedures described there due to thickening of the solution, even at low concentration of monomer. Agitation was totally lost during the termination reaction. The high viscosity of the reaction mixtures made the processes unattractive.

British Pat. No. 1,029,451 discloses the use of ethers in hydroxylation of live polymers with ethylene oxide to inhibit gel formation.

According to the present invention, the use of the acetal and ketal polymers and copolymers circumvents the gelation difficulties. The solutions obtained are of low viscosity, stirrable, and can be transferred from one reactor to another without the use of high pressure, making the procedure more attractive.

EXPERIMENTAL

The lithiated acetals are known, and knowledge of the corresponding ketals and their preparation is obvious. Methods representative of the preparation of the acetals and ketals follows.

Reference is made, more particularly, to lithium compounds and their use, but the sodium and potassium, etc. compounds which react similarly, and their use are included.

PREPARATION OF ACETALS

EXAMPLE 1

PREPARATION OF ETHYL 3-BROMOPROPYL ACETALDEHYDE ACETAL

Commercial 3-bromopropanol, as received, was stirred over powdered sodium carbonate until the pH was above 5 (about 6 hours) and then stored at $-30°$ C. over sodium carbonate until used.

Ethyl vinyl ether (212 ml, 203 g, 2.82 moles) was added to purified, non-acidic 3-bromopropanol (200 g, 1.44 moles) in a one-liter, three-necked flask equipped with a magnetic stirring bar, thermometer, and condenser with drying tube. Dichloroacetic acid (2.00 ml) was added. The temperature rose gradually to 50° C. over an hour. An hour later 1 ml. more of acid was added and again after 4 additional hours. The mixture was stirred overnight. In the morning, 8 g. of powdered sodium carbonate was added, and the mixture stirred for several hours. Filtration, removal of excess ethyl vinyl ether in vacuo, and vacuum distillation from sodium carbonate gave the required bromoacetal as a colorless liquid (bp 49°–51°/1 mm, 46 g.). The ethyl 3-bromopropyl acetaldehyde acetal which was produced, was stored over powdered sodium carbonate at $-30°$ C.

EXAMPLE 2

PREPARATION OF ETHYL 6-CHLOROHEXYL ACETALDEHYDE ACETAL

Ethyl 6-chlorohexyl acetaldehyde acetal was prepared from 6-chlorohexanol by a procedure analogous to that outlined in Example 1. Recipe was as follows:

| | |
|---|---|
| Cl⁺CH₂⁾₆OH | 250 gms. |
| CH₂=CH—OEt | 270 ml. |
| Cl₂CHCOOH | 2.7 ml. |

The reaction product

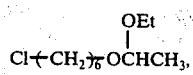

was recovered by vacuum distillation; bp 99°–101° C. at 8 mm. (376 gms.).

EXAMPLE 3

PREPARATION OF ETHYL p-IODOPHENOL ACETALDEHYDE ACETAL

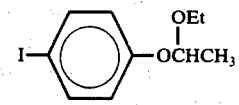

The preparation of the product follows with the substitution of p-iodophenol for 6-chlorohexanol, as in Example 2. The procedure is represented by the following equation:

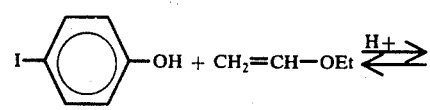

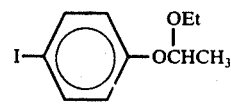

Similarly, p-bromophenol may be used to produce a bromo- compound.

EXAMPLE 4

PREPARATION OF ETHYL 3-BROMOPROPYL ACETONE KETAL

The ethyl vinyl ether of Example 1 is replaced by 1-methylethenyl ethyl ether (the latter being prepared in the two-step procedure described by Henze and Muschison J. Am. Chem. Soc. 53, 4077 (1931) for Step No. 1, and by Hurd and Botteron, J. Am. Chem. Soc. 68, 1200 (1946) for Step No. 2).

The 1-methylethenyl ethyl ether

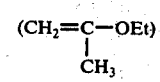

is reacted with a halohydrin, e.g. Br-(CH₂)₃-OH to form

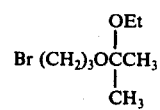

by the procedure described in Example 1. The chloro-derivative can be similarly prepared.

LITHIATION OF HALO ACETALS AND HALO KETALS

The acetals were lithiated by the procedures illustrated below.

EXAMPLE 5

PREPARATION OF ETHYL 3-LITHIOPROPYL ACETALDEHYDE ACETAL

The formula of the product is:

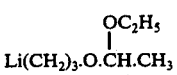

Li(CH$_2$)$_3$.O.CH.CH$_3$ with OC$_2$H$_5$ on the CH

A three-neck flask was charged with 200 ml. of dry diethyl ether and 0.22 g.-atoms of lithium dispersion (containing 1% Na). About 10% of a total of 0.094 mole of ethyl 3-bromopropyl acetaldehyde acetal was added at room temperature under anhydrous and anaerobic conditions. The remaining bromoacetal was added dropwise over a one-hour period at a temperature between 0° and −15° C. The mixture was stirred at 0° C. for an additional one hour and then transferred by positive argon pressure to a beverage bottle and subsequently filtered in a dry box to remove the unreacted lithium metal and the lithium bromide that was formed. The amber-colored filtrate was analyzed by the Gilman double titration method. (Total base = 0.195 M; Free Base = 0.115 M; % C-Li = 41.0%; Conc. C-li = 0.080 M).

Essentially the same procedure was repeated in hexane solution with the following titration results (before filtration). (Total base = 0.48 M; Free base = 0.410 M; % C-Li = 14.6%; Conc. C-Li = 0.07 M).

The titration results show the formation of active carbon-bound lithium.

EXAMPLE 6

PREPARATION OF ETHYL 6-LITHIOHEXYL ACETALDEHYDE ACETAL

A three-neck flask was charged with 300 ml. of dry diethyl ether and .79 g-atom of lithium dispersion in vaseline (containing 2% Na). About 10% of a total of 0.18 mole of ethyl 6-chlorohexyl acetaldehyde acetal was added at room temperature under anhydrous and anaerobic conditions. The remaining chloracetal was added dropwise over a one-hour period at a temperature between 0° and −15° C. The mixture was stirred at 0° C. for an additional hour, then transferred by positive argon pressure to a beverage bottle and subsequently filtered in a dry box to remove the unreacted lithium metal and the lithium chloride that was formed. The amber filtrate was analyzed by the Gilman double titration method. (Total base = 0.728 M; Free base = 0.55 M; % C-Li = 92.4%; Conc. C:Li = 0.67 M). The product was ethyl 6-lithiohexyl acetaldehyde acetal.

EXAMPLE 7

PREPARATION OF ETHYL p-LITHIOPHENYL ACETALDEHYDE ACETAL

Ethyl p-iodophenyl acetaldehyde acetal prepared in Example 3 is lithiated according to the procedure outlined in Example 5 to form p-lithiophenyl acetaldehyde acetal.

EXAMPLE 8

PREPARATION OF ETHYL 3-LITHIOPROPYL ACETONE KETAL

Ethyl 3-bromopropyl acetone ketal as prepared in Example 4 is lithiated by the procedure outlined in Example 5 to form ethyl 3-lithiopropyl acetone ketal.

EXAMPLES OF CLAIMED PROCEDURES AND PRODUCTS

1. INITIATORS FOR THE POLYMERIZATION OF CONJUGATED DIENES AND VINYL MONOMERS AND THE COPOLYMERIZATION OF CONJUGATED DIENES WITH ALIPHATIC OR AROMATIC VINYL MONOMERS.

New "live" polymers and copolymers are represented by the following formulae:

Acetal-R-P-Li and

Ketal-R-P-Li in which (a) acetal stands for hydroxy carrier acetal,

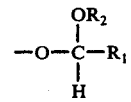

and ketal stands for hydroxyl carrier ketal,

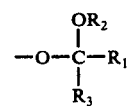

in which R$_1$, R$_2$ and R$_3$ are straight-chain or branched-chain or cycloalkyl groups of 1 to 3 or 5 or 10 or more carbon atoms or phenyl or alkyl phenyl in which each alkyl group contains 1 to 3 or more carbon atoms; it being understood that R$_1$ and R$_2$ may be alkyl groups which are part of a ring, e.g. a pyranyl group; and (b) P stands for a bivalent radical of a homopolymer or copolymer unit which includes at least two monomers, of which the following are representative:

Homopolymers of conjugated dienes and vinyl monomers:
  Polybutadiene
  Polyisoprene
  Polypiperylene
  Styrene and other vinyl monomers
Copolymers of conjugated dienes:
  Butadiene-isoprene
  Isoprene-piperylene
Copolymers of conjugated dienes and the following vinyl monomers:
  Styrene
  Alpha-methyl styrene
  p-Chlorostyrene
  Vinyl pyridine
  Vinyl naphthalene
  Vinyl anthracene
  Acrylonitrile
  Methacrylonitrile
  Alkyl methacrylates
  Alkyl acrylates
  Vinyl sulfones
  Alpha-nitro olefins and (c) R stands for a branched-chain or straight-chain or cycloalkylene group of 1 to 20 carbon atoms or phenylene or alkyl phenylene in which one or more alkyl substituents each contain 1 to 3 or more carbon atoms. The invention relates particularly to homopolymers and copolymers of conjugated dienes containing 4 to 6 carbon atoms and homopolymers of vinyl monomers and copolymers of such a conjugated diene with a vinyl monomer, such as illustrated immediately above and derivatives thereof. P and R have this meaning throughout the specification.

When the polymers and copolymers are prepared with a LiR catalyst an R-polymer or copolymer is formed and the expression R-polymer or R-copolymer is used in which R has the aforesaid meaning (also specifically, e.g. R-polybutadiene, etc.), when prepared by an LiR catalyst. Such catalysts include, for instance, methyl lithium
ethyl lithium
butyl lithiums
amyl lithiums
hexyl lithiums
octyl lithiums
decyl lithiums
allyl lithium
methallyl lithium
phenyl lithium
xylyl lithiums
tolyl lithiums
naphthyl lithiums and the similar aliphatic and aromatic lithiums, known to the art as in Foster U.S. Pat. No. 3,464,961.

The polymerizations using the lithioalkyl acetal or lithioalkyl ketal initiators are carried out by introducing the initiator and a hydrocarbon monomer (or monomers) such as butadiene (or butadiene and styrene) into a hydrocarbon solvent such as hexane, cyclohexane or aromatic solvents such as benzene, toluene, etc. The initiator, such as lithioalkyl acetal is introduced for the polymerization. The temperature at which the polymerization is carried out may range from −80° to about 150° C., and preferably does not exceed the boiling point of the monomer at atmospheric pressure. However, it is possible to work at a temperature above the boiling point of the solvent if the monomer is sufficiently soluble in the solvent used. In general, a temperature of 0° to 50° C. is suitable. The reaction time required is dependent on the temperature and solvent employed. At 15° C. satisfactory results are obtained if the polymerization is continued for about 12 hours. Other polar solvents such as tetrahydrofuran, diethyl ether, dioxane may be employed. When the polymerization is completed, a capping agent may be employed as described in what follows.

EXAMPLE 9

POLYMERIZATION OF BUTADIENE WITH ETHYL LITHIOALKYL ACETALDEHYDE ACETAL

The diethyl ether solutions or hexane slurries of lithium acetal initiators, ethyl 3-lithiopropyl acetaldehyde acetal and ethyl 6-lithiohexyl acetaldehyde acetal, as prepared in Example 5 and Example 6, were used as initiators for the polymerization of butadiene. A series of runs was made using variable amounts of initiator. The recipe was as follows:

| | |
|---|---|
| Butadiene, parts by weight | 250 |
| n-Hexane | 1000 |
| Initiator, milliequivalents | Variable |
| Time, hours | 12 |
| Temperature | 15° C. |

The amount of initiator is variable, depending upon the molecular weight desired $$\left(\text{e.g. } \frac{\text{gms. monomer}}{\text{eq. initiator}} = \frac{\text{kinetic}}{\text{molecular weight}} = \overline{M}_K\right).$$

A butadiene-hexane blend was charged into a reactor purged with $N_2$ or into baked, purged beverage bottles. The acetal-R-Li initiator was added and the reactants were agitated throughout the polymerization period. Acetal-R-polybutadienyl lithium was produced.

Such polymers which include a lithium metal at one end of the polymer chain and an acetal or ketal group at the other end of the polymer chain are characterized by particularly narrow molecular weight distributions (MWD). MWD, hereafter will be used to designate the ratio, $\overline{M}_w/\overline{M}_n$, as determined by gel permeation chromatography.

Good molecular weight control is possible with such initiators; the molecular weight of a polymer is thus dependent only on monomer and initiator charges. The preferred molecular weight range for chain-extendable liquid polyene polymers, however, is from 600–10,000.

The foregoing is illustrative of the production of a homopolymer. Other conjugated diene monomers may be used such as isoprene, piperylene, chlorobutadiene, etc., with other solvents usually employed in polymerizations and particularly aliphatic hydrocarbons.

The foregoing is likewise illustrative of copolymerization in which any of the foregoing-mentioned conjugated dienes and vinyl monomers are copolymerized. The amount of initiator employed will depend upon the concentrations employed and the temperatures employed may be those which are usual in copolymerization reactions. The temperature above given is illustrative and the reactions may be carried out at any usual polymerization temperature.

Polymers and copolymers having the formula Acetal- or Ketal-R-P-Li and a wide range of properties are producible, including flowable products to resilient solids of higher and lower glass transition temperatures. A wide variety of products, including those mentioned in the preliminary portion of this patent application, are obtainable, and such products may be used in reactions which are described in what follows.

The lithium alkyl ketals may be used as initiators in similar reactions.

The processes and products described and mentioned in connection with Example 9 are new.

2. THE PRODUCTION OF MONOACETAL AND MONOKETAL POLYMERS AND COPOLYMERS BY TERMINATING SUCH LIVE POLYMERS AND COPOLYMERS WITH ALCOHOLS, e.g. METHANOL, ISOPROPANOL, ETC.

The polymers and copolymers are new. The following formula is representative of the polymers and copolymers which are produced.

H-P-R-Acetal or -Ketal

The "live" polymer is used in solution in any suitable organic solvent and the solution is treated with an excess of any low-boiling aliphatic alcohol, such as methanol, ethanol, isopropanol, etc. The reaction can be carried out at any temperature from −35° C. to room temperature or above.

EXAMPLE 10

ACETAL-R-POLYBUTADIENE

An excess of methanol was added to the hexane solution of live acetal-R-polybutadienyl lithium which may contain a small amount of ether as described in Example 9. The mixture separated into two layers. The methanol layer, containing lithium methoxide (a by-product of the reaction) was discarded. Antioxidant (0.5 part for every 100 parts of polymer) was added to the hexane layer, containing the polymer. The polymer-containing layer was concentrated and dried on a rotary vacuum evaporator. The molecular weight distribution and compositions of various polymers were determined, and are recorded in the following table.

The presence of the acetal end group was established by infrared analysis of the products (strong C-O-C absorption at 8.8–9.5μ).

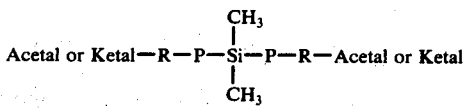

These polymers may be flowable or may be solids. With different joining agents, the joining unit will of course be different in the polymer or copolymer that is produced; the foregoing formula being illustrative of the polymer or copolymer produced when $Cl_2Si(CH_3)_2$ is used as the joining agent.

The di- or poly-acetal or ketal-R-polymers or -R-copolymers are usually prepared at a low temperature, and the joining agent may be added at this temperature, which may be as low as −35° C., but usually a higher temperature will be used, up to 50° C. in order to increase the speed of the reaction.

TABLE I

| POLYMER NO. | INITIA-TOR | MOLES INITIATOR | g.BUTADIENE | CONVERSION % | MICROSTRUCTURE |||||
|---|---|---|---|---|---|---|---|---|---|
| | | | | | MWD | Cis-1,4% | Trans-1,4% | 1,2% | T.F.% |
| 1 | A* | 0.024 | 78.5 | 100 | 1.06 | 21.9 | 41.7 | 36.4 | 87.3 |
| 2 | A* | 0.020 | 78.5 | 100 | 1.05 | 16.5 | 44.9 | 38.6 | 90.3 |
| 3 | B** | 0.020 | 78.5 | 100 | 1.07 | 10.5 | 35.5 | 54.0 | 89.4 |

*Ethyl 6-lithiohexyl acetaldehyde acetal
**Ethyl 3-lithiopropyl acetaldehyde acetal
T.F. = Empirically determined total % unsaturation (of all microstructures) in the polymer.

3. THE PRODUCTION OF DIACETAL, DIKETAL, POLYACETAL AND POLYKETAL R-POLYMERS AND R-COPOLYMERS BY TERMINATING THE AFORESAID "LIVE" POLYMERS AND COPOLYMERS WITH A DIFUNCTIONAL OR POLYFUNCTIONAL JOINING AGENT.

The di- and poly-acetal or ketal-R-polymers and -R-copolymers and process for preparing the same are new. They are not anticipated by such art as NASA Brief Tech. 71-10184 or Zelinski et al., Jour. Pol. Sci. Part A 3, 93–103 (1965). They may be prepared from any of the polymers and copolymers defined above.

When di-joining agents (e.g. $CH_2Cl_2$, $ClCH_2CH_2CH_2Cl$, $Cl_2Si(CH_3)_2$, $C_6H_4(CH_2Cl)_2$, $Cl-CH_2-OCH_2Cl$,

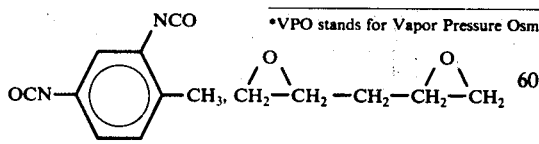

and $OCH-CH_2-CHO$, etc.) are reacted with "live" R-polymer or R-copolymer acetals or ketals, the resulting polymers or copolymers are diacetal or diketal polymers or copolymers. The following formula is representative of such polymers and copolymers:

EXAMPLE 11

DIMETHYL DI(ACETAL-R-POLYBUTADIENYL)SILANE

A solution of "live" acetal-R-polybutadienyl lithium (0.08 mole), (prepared according to Example 9) was cooled to 0° C. A stoichiometric amount of $Cl_2Si(CH_3)_2$ (0.04 mole) was added incrementally to the acetal-R-polybutadienyl lithium with vigorous stirring. After 20 hours the mixture was allowed to warm to room temperature (28° C.). An excess of n-butyllithium was then added to react with any unreacted $Cl_2Si(CH_3)_2$ and then the batch was dropped into an excess of methanol containing 0.5 part of 2,6-di-tert.-butyl-4-methylphenol. The solvent was stripped on a rotary vacuum evaporator. Two such examples were prepared. When appropriate care is exercised a good correspondence between theoretical and experimental molecular weights was realized with little or no broadening of the MWD (Table II). The presence of acetal end groups was demonstrated by IR (strong C-O-C absorption 8.8–9.5μ).

TABLE II

| POLYMER NO. | THEORETICAL $\overline{M}_k$ EACH CHAIN | THEORETICAL $\overline{M}_k$ JOINED PRODUCT | $\overline{M}_n$ JOINED PRODUCT (VPO or GPC)* | MWD |
|---|---|---|---|---|
| 4 | 1620 | 3240 | 3200 | 1.1 |
| 5 | 1685 | 3370 | 3616 | 1.1 |

*VPO stands for Vapor Pressure Osmometry and GPC stands for Gel Permeation Chromatography.

When "live" R-polymer or R-copolymer acetals or ketals are terminated with polyfunctional joining agents, e.g.

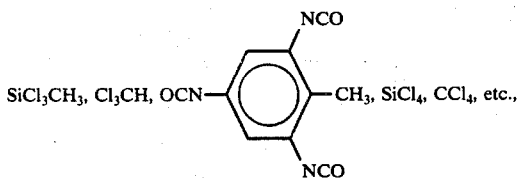

polyacetal or polyketal R-polymers or R-copolymers are formed. For example, when Cl₃SiCH₃ is used as a joining agent the following formula is representative of the polymers and copolymers formed:

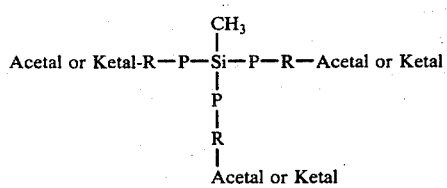

With different joining agents, the joining unit will, of course, be different, and the number of polymer or copolymer units will depend upon whether the joining agent is trifunctional, tetrafunctional, etc.

EXAMPLE 12

METHYL TRI(ACETAL-R-POLYBUTADIENYL) SILANE

To 0.105 mole of acetal-R-polybutadienyl lithium (prepared according to Example 9) was added 0.035 mole of Cl₃SiCH₃ at 13.0° C. and reacted for two days. An excess of τ-butyllithium was then added to react with any unreacted Cl₃SiCH₃ and then the batch was dropped into an excess of methanol (containing 0.5 part DBPC). The solvent was stripped on a rotary vacuum evaporator. The polymer is characterized in Table III. The presence of acetal terminal end groups was demonstrated by strong C-O-C absorption (8.8–9.5μ) in the infrared spectrum of this polymer.

resulting polymers are terminated at one end by an acetal or ketal moiety and by an (X) functional group at the other chain end. The termination may be carried out at any suitable temperature as, for example, −35° to 50° C.

The following formula is representative of the polymers and copolymers:

Acetal or Ketal-R-P-R'-OH in which R and P have the meanings previously described and R' is an alkyl group of 1 to 10 carbon atoms when an epoxide is used to terminate the live acetal or ketal polymer.

EXAMPLE 13

2-(ACETAL-R-POLYBUTADIENYL) ETHANOL

Butadiene was polymerized with lithium alkyl acetaldehyde acetal as described in Example 9. After removal from the polymerizer, a bottle of the polymer solution was cooled in dry ice. Ethylene oxide, which had been flash distilled and stored over calcium hydride, was added by double needle as a liquid (either as a stoichiometric amount or in excess) to the "live" polymer at dry ice temperature. The dry ice was allowed to evaporate overnight. (When a reactor is used, the ethylene oxide is added directly to the reactor at 0°–15° C. and reacted overnight.) There was no evidence of gelation (complexation) during the ethylene oxide reaction even when stoichiometric amounts of the epoxide are used. The temperature of the ethylene oxide reaction was varied from −78° to +50° C., still without gel formation. However, temperatures from −78° to +15° C. generally gave the best functionality data. Antioxidant (DBPC) was added and the polymer was quenched in an excess of methanol. Usually enough methanol was added to solubilize the LiOMe, formed as by-product. The polymer solutions were concentrated on a rotary vacuum evaporator.

The reaction is represented by the following equation:

TABLE III

| POLYMER NO. | THEORETICAL $\overline{M}_k$ EACH BRANCH | THEORETICAL $\overline{M}_k$ JOINED POLYMER | $\overline{M}_n$ (GPC) | MWD |
|---|---|---|---|---|
| 6 | 1500 | 4500 | 4200 | 1.1 |

4. THE PRODUCTION OF MONOACETAL AND MONOKETAL-MONO(X) POLYMERS AND COPOLYMERS BY TERMINATING SAID "LIVE" POLYMERS AND COPOLYMERS WITH SUITABLE X REAGENTS.

The polymers and copolymers are new as in the process for producing such materials. The polymers and copolymers that can be used comprise units defined above.

When "live"]R-polymer and R-copolymer acetals and ketals are terminated with a suitable anionically reactive agent, e.g. an epoxide, an aldehyde, a ketone, carbon dioxide, carbon disulfide, sulfur, an alkyl disulfide, etc. and then terminated with a protic solvent, the

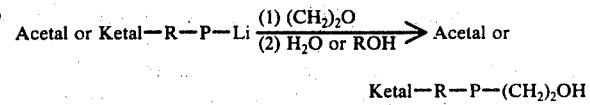

Ketal—R—P—(CH₂)₂OH

The presence of acetal and OH end groups was demonstrated by polymer infrared absorptions at 8.8–9.5μ and 2.9–3.0μ, respectively. Typical polymer characteristics are given in Table IV. Typical hydroxyl functionality data (Table V) quantitatively demonstrates the presence of OH end groups.

TABLE IV

| POLYMER NO. | INITIATOR | MOLES INITIATOR | g-BUTADIENE | % CONVERSION | MWD | MICROSTRUCTURE | | | |
|---|---|---|---|---|---|---|---|---|---|
| | | | | | | Cis-1,4% | Trans-1,4% | 1,2% | T.F.% |
| 7 | A* | 0.021 | 78.5 | 100 | 1.05 | 17.0 | 37.1 | 45.9 | 88.9 |
| 8 | A* | 0.09 | 177 | 100 | 1.05 | 17.7 | 30.9 | 51.3 | 89.7 |
| 9 | A* | 0.07 | 172 | 100 | 1.05 | 16.8 | 33.3 | 49.8 | 88.7 |

TABLE IV-continued

| POLYMER NO. | INITIATOR | MOLES INITIATOR | g-BUTADIENE | % CONVERSION | MWD | MICROSTRUCTURE Cis-1,4% | Trans-1,4% | 1,2% | T.F.% |
|---|---|---|---|---|---|---|---|---|---|
| 10 | A* | 0.012 | 70.0 | 100 | 1.05 | 22.5 | 39.3 | 38.2 | 90.9 |

*Ethyl 6-lithiohexyl acetaldehyde acetal
T.F. = Empirically determined total % unsaturation (of all microstructures) in the polymer.

TABLE V

| POLYMER NO. | $M_n$ (GPC or VPO) | OH meq/gm | EXP. f(OH) | THEORY f(OH) |
|---|---|---|---|---|
| 7 | 5686 | 0.18 | 1.07 | 1.0 |
| 8 | 1943 | 0.48 | 0.93 | 1.0 |
| 9 | 2415 | 0.31 | 0.99 | 1.0 |
| 10 | 6217 | 0.14 | 0.87 | 1.0 |

5. THE CONVERSION OF ACETAL AND KETAL TERMINATED R-POLYMERS AND R-COPOLYMERS TO HYDROXY-TERMINATED R-POLYMERS AND R-COPOLYMERS

Acetal and ketal terminated R-polymers and R-copolymers can be converted to hydroxyl-terminated polymers by hydrolysis. The polymers and copolymers can be any of the acetal or ketal-terminated polymers and copolymers disclosed above. This process is new. The acetal and ketal terminated R-polymers and R-copolymers are dissolved in a suitable solvent (containing at least some protic material). In the case of polybutadiene acetals, the polymers are first completely dissolved in a hydrocarbon medium, e.g. hexane, heptane, benzene, toluene, etc., and then a protic solvent, e.g. water, methanol, ethanol, etc. is added. The relative proportions of protic solvent and hydrocarbon solvent can vary from trace amounts of protic material to a fraction of protic solvent up to but not exceeding the solubility requirements of the polymer. The preferred solvent mixtures are toluene/H$_2$O mixtures with the percent of water varying from 0-25 percent. The choice of the toluene/H$_2$O solvent mixture has the added advantage of relatively high binary azeotrope boiling point of 85° C. (at 1 atm.). The conversion of acetal-terminated polymers and copolymers to hydroxy-terminated polymers and copolymers requires an acid catalyst. Both inorganic (e.g. HCl) and organic acid (e.g. CH$_3$COOH, Cl$_2$CHCOOH, p-toluenesulfonic acid, methane sulfonic acid, etc.) catalysts can effect the hydrolysis of the acetal moiety. However, dichloroacetic acid (Cl$_2$CHCOOH) is the acid catalyst of choice. For the toluene/H$_2$O solvent mixture, the preferred acid catalyst concentration is 0.6-1.0 gm Cl$_2$CHCOOH per 100 g. polymer per 500 ml. of solvent. The hydrolysis mixture is heated while a stream of nitrogen is passed through the mixture to entrain volatile by-products of the hydrolysis.

The hydrolysis can be carried out at any suitable temperature, such as −35° to 150° C., but usually between 50° and 80° C.

The reaction is illustrated by the following equation:

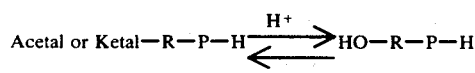

EXAMPLE 14

PREPARATION OF MONOHYDROXY R-BUTADIENE

Mono-acetal-R-butadiene prepared according to the procedure of Example 10 (Table I) was dissolved in a 75:25 toluene-H$_2$O mixture. Dichloroacetic acid (0.6 g. per 100 g. polymer per 500 ml. solvent) was added as catalyst for the hydrolysis of the terminal acetal groups. The mixture was then refluxed overnight or until there was no change in the OH-region (2.9µ) and C-O-C region (8.8-9.5µ) of the infrared spectrum of the reaction mixture. A stream of nitrogen was passed through the mixture for the duration of the reflux to entrain the acetaldehyde as it was formed. The polymer layer was neutralized with 10 percent NaOH or 10 percent Na$_2$CO$_3$ and concentrated on a rotary vacuum evaporator. The analytical functionality data of monohydroxy polymers is recorded below (Table VI), the polymers being identified by the addition of the letter A to the numbers used in Table I, for their mono-acetal-R-polymer precursors. In other words, the hydroxy-R-polymers in Table VI are the result of treating the three acetal R-polymers in Table I with Cl$_2$CHCOOH as in Example 14.

TABLE VI

| POLYMER NO. | $M_n$ (GPC or VPO) | OH meq/gm | EXP. f(OH) | THEORY f(OH) |
|---|---|---|---|---|
| 1A | 6140 | 0.19, 0.17 | 1.11 | 1.0 |
| 2A | 6231 | 0.14, 0.15 | 0.91 | 1.0 |
| 3A | 10857 | 0.80 | 0.87 | 1.0 |

Bromo- and fluoro-acetic acid may be substituted for other weakly acidic chloroacids referred to herein for effecting such hydrolyses and hydrolyses such as those described in the examples, and the conditions known for hydrolysis of ketal and acetal compounds may be used.

EXAMPLE 15

DIMETHYL DI(HO-R-POLYBUTADIENYL) SILANE and 2-(HO-R-BUTADIENYL)ETHANOL

One diacetal-terminated R-polymer (prepared according to Example 11) and three monoacetal-monohydroxy terminated R-polymers (prepared according to Example 13) were separately dissolved in a 75:25 toluene:H$_2$O mixture. Dichloroacetic acid (1.0 g. per 100 g. polymer per 500 ml. solvent) was added as catalyst for the hydrolysis of the terminal acetal groups. The mixtures were refluxed overnight at 75°-85° C., or until there was no change in the OH-region (2.9µ) and the C-O-C region (8.8-9.5µ) of the infrared spectrum of each reaction mixture. A stream of nitrogen was passed through each mixture for the duration of the reflux to entrain the acetaldehyde as it was formed. Each polymer layer was neutralized with 10 percent Na$_2$CO$_3$ and concentrated on a rotary vacuum evaporator. A sampling of data for dihydroxy terminated polymers prepared in this manner is given in Table VII. The letter A has been added to the numbers of the products to indicate that the polymers treated were Polymers No. 5 of Example 11 and Nos. 8, 9 and 10 of Example 13. Polymer No. 5A is dimethyl di(HO-R-polybutadienyl) silane and Polymer Nos. 8A, 9A and 10A are 2-(HO-R-butadienyl) ethanol.

TABLE VII

| POLYMER NO. | $M_n$ (GPC or VPO) | OH meq/gm. | EXP. f (OH) | THEORY f (OH) |
|---|---|---|---|---|
| 5A | 4037 | 0.47 | 1.89 | 2.0 |
| 8A | 2317 | 0.83 | 1.92 | 2.0 |
| 9A | 2524 | 0.70 | 1.77 | 2.0 |
| 10A | 6147 | 0.32 | 1.97 | 2.0 |

The series of Examples 9, 11 and 15 and the series of Examples 9, 13 and 15 set forth below, constitute novel methods of preparing dihydroxy polymers of high purity without a concomitant gel problem.

It is known in the art that the production of di-(OH-R)-polybutadiene polymers by the ethylene oxide termination of dilithium polymers has a great propensity to gel (S. Reed, J. Poly. Sci. A-1, 1187, 1972). A number of patents have been issued on methods of combating gel formation based on very delicate balances of stoichiometry, temperature, solvent medium, etc. (Goldberg, U.S. Pat. No. 3,055,952; H, Hsieh, U.S. Pat. No. 3,175,977; National Distillers and Chem. Corp., British Pat. No. 1,029,451.)

The advantage of the series of processes diagrammed below and involving the procedures of Examples 9, 13 and 15 is that when ethylene oxide end-capping is used to terminate the live acetal polymer there is no gel formation, independent of stoichiometry, temperature, etc.

The steps of the procedures resulting in the final production of the hydrolysis product illustrated in the equations immediately above, are illustrated in the examples, as noted, and therefore are not repeated.

EXAMPLE 16

METHYL TRI(HYDROXY-R-POLYBUTADIENYL) SILANE

Triacetal terminated polymer (prepared according to Example 12), (147 gms.) was dissolved in 725 ml. of (75:25) toluene:$H_2O$. A 1.5 gms. quantity of $Cl_2CHCOOH$ (catalyst) was added and the mixture was refluxed overnight under a steady stream of $N_2$ (to entrain the acetaldehyde as it was formed). The material was washed with 10 percent $K_2CO_3$ and $H_2O$ (until neutral to litmus). The polymer was concentrated on a rotary vacuum evaporator. The following functionality data was achieved for the preparation of a trihydroxy-terminated polymer (Table VIII). The letter A has been added to the number of the polymer product to indicate that the polymer treated was Polymer No. 6 of Example 12.

TABLE VIII

| POLYMER NO. | $M_n$ (GPC) | OH meq/gm | EXP. f (OH) | THEORY f (OH) |
|---|---|---|---|---|
| 6A | 4838 | 0.58 | 2.8 | 3.0 |

6. CHAIN-EXTENDED HYDROLYZED TERMINAL ACETAL AND KETAL POLYMERS.

Terminal HO-R-P-R'-OH and (HO-R-P)$_x$A polymers and copolymers derived from Acetal or Ketal-R-P-R'-OH and (Acetal or Ketal-R-P)$_x$A polymers and copoly-

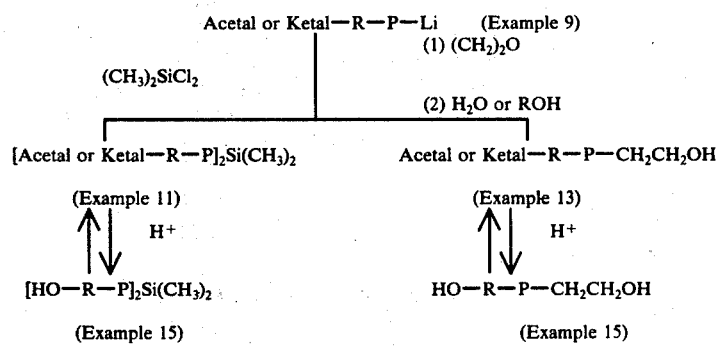

mers as described herein are chain extendible by a variety of agents to form highly useful products.

Processes are known to the art for converting hydroxyl-terminated diene polymers into sulfur-curable elastomers with diisocyanates (e.g. P. W. Ryan, J. Elastoplastics 3, 57, (1971).)

The foregoing two hydroxyl-terminated polymers also may be chain extended with diisocyanates to form sulfur-curable elastomers, and with organic diacids (to form polyesters), dicarbonates (to form polycarbonates), diepoxides (to form polyethers), etc. The following example is illustrative.

EXAMPLE 17

Polymers (prepared according to Examples 15 and 16) are chain-extended according to the following procedure:

The polymer is mixed with basic catalyst (e.g. dibutyl tin dilaurate) and may be compounded with carbon black and antioxidant or the like, together with toluene Furthermore, the above equations illustrate that the processes described herein have an added versatility in that the troublesome ethylene oxide end-capping reaction can be avoided altogether by using suitable joining processes and acetal hydrolysis (Examples 9, 11, 15).

The equations illustrate the use of ethylene oxide, but any epoxide used for end-capping such as those previously mentioned herein may be employed, and the hydrolysis may be carried out at temperatures from −35° to 150° C. with temperatures of 50° to 80° C. being preferred. Instead of $(CH_3)_2SiCl_2$, one might use $CH_3SiCl_3$ or $SiCl_4$, or like alkyl compounds in which the alkyl groups contain 1 to 10 carbon atoms, or the corresponding compounds of other halogens. Thus the acetal or ketal polymer and the hydroxyl polymer derived from it may contain up to four acetal, ketal or hydroxyl repeating units, depending upon the number of chlorine atoms attached to the reactant chlorosilane. The hydrolysis is carried out by any of the aforesaid procedures, using a weak acid system.

diisocyanate or other chain-extending agent disclosed herein. After the solid reactants are weighed, the mixture is transferred to a three-roll paint mill and milled for 30 minutes. The paste-like product is cast into appropriate molds and allowed to reach partial gelation at room temperature before curing under pressure. The products which are formed exhibit physical properties (e.g. tensile strength, elongation, compression set, etc.) in ranges desired for elastomeric materials. If a diisocyanate, OCN-R''-NCO, is used as a chain-extending agent, the polymer HO-R-P-R'-OH is thus converted to

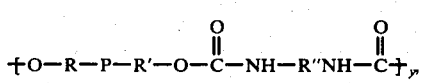
(I)

and the polymer (HO-R-P)$_x$A is converted to

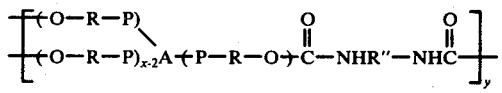
(II)

In Formula I of conversion products (a) R and R' stand for different straight-chain or branched-chain or cyclo-alkylene groups of 1 to 20 carbon atoms or phenylene or alkyl phenylene in which each alkyl group contains 1 to 3 carbon atoms, (b) P stands for a homopolymer or copolymer of a conjugated diene of 4 to 6 carbon atoms or homopolymer of a vinyl monomer or a copolymer of such a conjugated diene and a vinyl monomer and (c) $y$ is a whole number which represents the number of repeating urethane units in the polymer, and (d) R'' stands for a straight- or branched-chain, or cyclo-alkylene, phenylene or alkyl phenylene residue from the diisocyanate, OCN-R''-NCO.

In Formula II of conversion products (a) R stands for a straight-chain or branched-chain or cyclo-alkylene group of 1 to 20 carbon atoms or phenylene or alkyl phenylene in which each alkyl group contains 1 to 3 carbon atoms, (b) P stands for a homopolymer or copolymer of a conjugated diene of 4 to 6 carbon atoms or a homopolymer of a vinyl monomer or a copolymer of such a conjugated diene and a vinyl monomer, (c) A stands for a joining-agent residue, (d) $x$ is a whole number less than or equal to the valence of the joining-agent residue, (e) R'' stands for a straight-chain, or branched-chain, or cyclo-alkylene, phenylene, or alkyl phenylene residue from the diisocyanate, OCN-R''-NCO, and (f) $y$ is a whole number which represents the number of repeating urethane units in the polymer, it being understood that when $x = 2$, Formula II has the linear repeating units

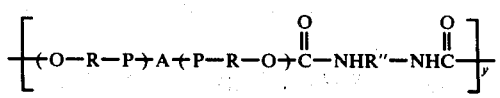

and when $x$ is greater than 2, Formula II has branched or network repeating units. For example, when $x = 3$, the formula is

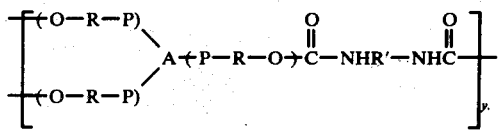

We claim:
1. The process of producing an hydroxy polymeric material having the formula

HO.R.P.R'.OH which comprises reacting a material of the formula

Acetal or Ketal-R-P-Li with an expoxide and obtaining a polymeric material of the formula

Acetal or Ketal-R-P-R'-OH and thereafter hydrolyzing the acetal or ketal group with an acid medium and producing a compound of the formula

HO.R.P.R'.OH in which (a) R stands for a straight-chain or branched-chain or cyclo-alkylene group of 1 to 20 carbon atoms or phenylene or alkyl phenylene in which each alkyl group contains 1 to 3 carbon atoms, (b) P stands for a homopolymer or copolymer of a conjugated diene containing 4 to 6 carbon atoms, or a homopolymer of a vinyl monomer, or a copolymer of such a diene and a vinyl monomer, (c) R' is different from R and is the residue left from the epoxide used in the hydroxylation and (d) the acetal or ketal is a hydrocarbon aliphatic or aromatic acetal or ketal and is an hydroxyl carrier.

2. Polyurethanes of the formula

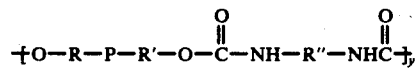

in which (a) R and R' stand for different straight-chain or branched-chain or cyclo-alkylene groups of 1 to 20 carbon atoms or phenylene or alkyl phenylene in which each alkyl group contains 1 to 3 carbon atoms, (b) P stands for a homopolymer or copolymer of a conjugated diene of 4 to 6 carbon atoms, or a homopolymer of a vinyl monomer, or a copolymer of such a conjugated diene and a vinyl monomer, (c) $y$ is a whole number which represents the number of urethane repeating units in the polymer, and (d) R'' stands for a straight- or branched-chain, or cyclo-alkylene, phenylene or alkyl-phenylene residue from the diisocyanate, OCN-R''-NCO.

3. Polyurethanes of the formula

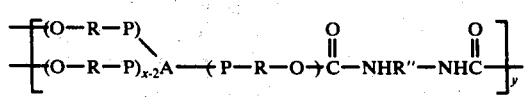

in which (a) R stands for a straight-chain or branched-chain or cyclo-alkylene group of 1 to 20 carbon atoms or phenylene or alkyl phenylene in which each alkyl group contains 1 to 3 carbon atoms, (b) P stands for a homopolymer or copolymer of a conjugated diene of 4 to 6 carbon atoms, or a homopolymer of a vinyl monomer, or a copolymer of such a conjugated diene and a vinyl monomer, (c) A stands for a joining-agent residue, (d) R" stands for a straight-or branched-chain, or cyclo-alkylene, phenylene or alkyl phenylene residue from the diisocyanate, OCN-R"-NCO, (e) $x$ is a whole number less than or equal to the valence of the joining-agent residue and (f) $y$ is a whole number which represents the number of repeating urethane units.

4. Polyurethanes of claim 3 in which $x = 2$ and the polyurethane is a linear polymer represented by the formula

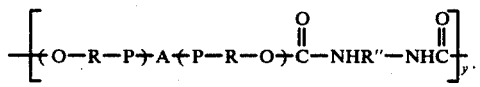

5. Polyurethanes of claim 3 in which $x = 3$ and the polyurethane is represented by the formula

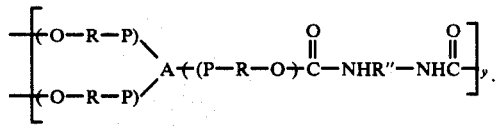

6. The process of producing a polyurethane from a dihydroxy or polyhydroxy polymer of the formula

or

respectively, in which (a) R and R' each stand for a straight-chain or branched-chain or cyclo-alkylene group of 1 to 20 carbon atoms or phenylene or alkyl phenylene in which each alkyl group contains 1 to 3 carbon atoms, R and R' being different in the dihydroxy polymer, (b) P stands for a homopolymer or copolymer of a conjugated diene of 4 to 6 carbon atoms, or a homopolymer of a vinyl monomer, or a copolymer of such a conjugated diene and a vinyl monomer, (c) A is the residue of a joining agent and (d) $x$ is a whole number less than or equal to the valence of the joining-agent residue, which process comprises reacting the dihydroxy or polyhydroxy polymer with a diisocyanate, OCN-R"-NCO, and when the polymer is a dihydroxy polymer obtaining a polyurethane of the formula

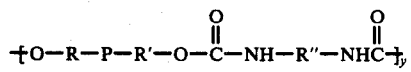

and when the polymer is a polyhydroxy polymer obtaining a polyurethane of the formula

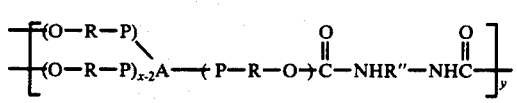

in which polyurethane formulae the letters R, P, R', A and $x$ have the aforesaid meanings and $y$ is a whole number equal to the number of repeating urethane units in the polymer.

7. Polymers and copolymers having the formula

Acetal or Ketal-R-P-X in which (a) the acetal or ketal is a hydrocarbon aliphatic or aromatic acetal or ketal, the acetal or ketal being a hydroxyl carrier, (b) R stands for a straight-chain or branched-chain or cyclo-alkylene group of 1 to 20 carbon atoms or phenylene or alkyl phenylene in which each alkyl group contains 1 to 3 carbon atoms, (c) P stands for a homopolymer or copolymer of conjugated diene of 4 to 6 carbon atoms, or a homopolymer of a vinyl monomer, or a copolymer of such a diene and a vinyl monomer, and (d) X is the residue after reaction of such a polymer or copolymer with a compound of the class of anionically reactive agents.

8. The process of producing a compound of the formula Hydrocarbon Aliphatic or Aromatic Acetal or Ketal-R-P-X which comprises treating Hydrocarbon Aliphatic or Aromatic Acetal or Ketal-R-P-Alkali Metal and replacing the alkali metal with an anionically reactive agent which leaves the moiety X; in which formula (a) R stands for a straight-chain or branched-chain or cyclo-alkylene group of 1 to 20 carbon atoms or phenylene or alkyl phenylene in which each alkyl group contains 1 to 3 carbon atoms and (b) P stands for a homopolymer or copolymer of conjugated diene of 4 to 6 carbon atoms, or a homopolymer of a vinyl monomer, or a copolymer of such a diene and a vinyl monomer; the acetal or ketal being an hydroxyl carrier.

9. The process of hydrolyzing a hydrocarbon aliphatic or aromatic acetal or ketal R-polymer or copolymer in which (a) the acetal or ketal is an hydroxyl carrier, (b) R stands for a straight-chain or branched-chain or cyclo-alkylene group of 1 to 20 carbon atoms or phenylene or alkyl phenylene in which each alkyl group contains 1 to 3 carbon atoms, (c) the polymers are homopolymers of conjugated diene containing 4 to 6 carbon atoms, or homopolymers of vinyl monomers, and (d) the copolymers are copolymers of such conjugated dienes or copolymers of such a conjugated diene and a vinyl monomer, which process comprises hydrolyzing the acetal or ketal group or groups in the aforesaid in dilute acid medium.

10. The process of hydrolyzing a hydrocarbon aliphatic or aromatic acetal or ketal R-polymer or copolymer in which (a) the acetal or ketal is an hydroxyl carrier, (b) R stands for a straight-chain or branched-chain or cyclo-alkylene group of 1 to 20 carbon atoms or phenylene or alkyl phenylene in which each alkyl group contains 1 to 3 carbon atoms, (c) the polymers are homopolymers of conjugated dienes of 4 to 6 carbon atoms, or homopolymers of vinyl monomers, and (d) the copolymers are copolymers of such conjugated dienes of copolymers of such a conjugated diene and a vinyl monomer, which process comprises reacting acetal or ketal R-polymer or copolymer with an acid catalyst in a hydrocarbon-$H_2O$ mixture and entraining the volatile hydrolysis decomposition products of the acetal or ketal.

11. The products process of claim 7 in which the acetal or ketal is aliphatic.

* * * * *

UNITED STATES PATENT OFFICE
CERTIFICATE OF CORRECTION

Patent No. 4,052,370                    Dated October 4, 1977

Inventor(s) Adel Farhan Halasa and Donald Norman Schulz

It is certified that error appears in the above-identified patent and that said Letters Patent are hereby corrected as shown below:

Column 1, line 51, "sulfur of peroxide" should read as --- sulfur or peroxide ---

Column 7, line 54, "form p-lithiophenyl" should read as --- form ethyl p-lithiophenyl ---

Column 13, line 34, "r-butyllithium" should read as --- n-butyllithium ---

Column 13, line 58, "When "live_7 R-polymer" should read as --- When "live" R-polymer --- no bracket should be included Column 13, in Table IV at the bottom, the heading "g-BUTADIENE" should read as --- g. BUTADIENE ---

Column 15, in Table IV-continued, the heading "g-BUTADIENE" should read as --- g. BUTADIENE ---

Column 22, Claim 10, line 58, "dienes of copolymers" should read as --- dienes or copolymers ---

UNITED STATES PATENT OFFICE
CERTIFICATE OF CORRECTION

Patent No. 4,052,370          Dated October 4, 1977

Inventor(s) Adel Farhan Halasa and Donald Norman Schulz

It is certified that error appears in the above-identified patent and that said Letters Patent are hereby corrected as shown below:

Column 22, Claim 11, line 64, "The products process of claim 7" should read as --- The products of claim 7 ---

Signed and Sealed this

Thirty-first Day of October 1978

[SEAL]

Attest:

RUTH C. MASON
Attesting Officer

DONALD W. BANNER
Commissioner of Patents and Trademarks